United States Patent
Burcher et al.

(10) Patent No.: US 11,601,548 B2
(45) Date of Patent: Mar. 7, 2023

(54) CAPTIONED TELEPHONE SERVICES IMPROVEMENT

(71) Applicants: Beryl Burcher, Chattanooga, TN (US); James van den Bergh, Chattanooga, TN (US)

(72) Inventors: Beryl Burcher, Chattanooga, TN (US); James van den Bergh, Chattanooga, TN (US)

(*) Notice: Subject to any disclaimer, the term of this patent is extended or adjusted under 35 U.S.C. 154(b) by 0 days.

(21) Appl. No.: 17/184,006

(22) Filed: Feb. 24, 2021

(65) Prior Publication Data
US 2021/0250441 A1   Aug. 12, 2021

Related U.S. Application Data

(63) Continuation-in-part of application No. 15/930,612, filed on May 13, 2020, now Pat. No. 11,438,455.

(60) Provisional application No. 62/980,686, filed on Feb. 24, 2020, provisional application No. 62/854,774, filed on May 30, 2019, provisional application No. 62/851,918, filed on May 23, 2019, provisional application No. 62/849,425, filed on May 17, 2019.

(51) Int. Cl.
*H04M 3/42* (2006.01)
*G10L 15/26* (2006.01)
*H04M 3/436* (2006.01)

(52) U.S. Cl.
CPC ......... *H04M 3/42382* (2013.01); *G10L 15/26* (2013.01); *H04M 3/42391* (2013.01); *H04M 3/436* (2013.01); *H04M 2201/405* (2013.01)

(58) Field of Classification Search
CPC ......... H04M 3/42382; H04M 3/42391; H04M 3/436; H04M 2201/405; H04M 2203/5018; H04M 3/53333; H04M 2201/40; G10L 15/26
See application file for complete search history.

(56) References Cited

U.S. PATENT DOCUMENTS

| | | | | |
|---|---|---|---|---|
| 5,774,857 A | * | 6/1998 | Newlin | G09B 21/009 704/200 |
| 6,266,615 B1 | * | 7/2001 | Jin | G08G 1/005 701/488 |
| 6,332,122 B1 | * | 12/2001 | Ortega | G10L 15/26 704/270 |
| 7,035,804 B2 | * | 4/2006 | Saindon | G06F 40/58 704/271 |
| 7,822,050 B2 | * | 10/2010 | DeGrazia | H04M 3/42391 704/207 |
| 7,830,408 B2 | * | 11/2010 | Asthana | H04N 7/147 348/14.09 |

(Continued)

*Primary Examiner* — Lisa Hashem
(74) *Attorney, Agent, or Firm* — Miller & Martin PLLC; Stephen J. Stark

(57) ABSTRACT

Internet Protocol captioned telephone service often utilizing Automated Speech Recognition can be utilized with conference calls to separate out each of the various parties' speech as text, such as with text bubbles differentiated by caller on a device of the user. Additionally, a prioritized vocabulary can be provided for each user that is not shared with a public so that if the user utilizes words in their speech not common in the general public, those words can be more accurately identified by the telephone service. The service may learn and apply that vocabulary and/or the user may provide words to the service.

10 Claims, 3 Drawing Sheets

(56) References Cited

U.S. PATENT DOCUMENTS

| | | | |
|---|---|---|---|
| 8,140,632 B1* | 3/2012 | Jablokov | G06Q 30/02 704/235 |
| 8,407,049 B2* | 3/2013 | Cromack | G10L 15/26 704/7 |
| 8,447,285 B1* | 5/2013 | Bladon | H04W 4/16 379/85 |
| 8,593,501 B1* | 11/2013 | Kjeldaas | H04L 12/1818 704/235 |
| 8,825,770 B1* | 9/2014 | Jablokov | G06Q 30/02 704/235 |
| 9,374,536 B1* | 6/2016 | Nola | H04N 7/141 |
| 9,436,357 B2* | 9/2016 | Pallakoff | G06F 3/0483 |
| 9,674,351 B1* | 6/2017 | Mason | H04M 3/5183 |
| 9,917,947 B2* | 3/2018 | Charugundla | G10L 15/26 |
| 9,946,842 B1* | 4/2018 | Stringham | G16H 80/00 |
| 10,389,876 B2* | 8/2019 | Engelke | H04W 4/12 |
| 10,573,312 B1* | 2/2020 | Thomson | G10L 15/22 |
| 2002/0129106 A1* | 9/2002 | Gutfreund | G06Q 10/10 709/205 |
| 2006/0020962 A1* | 1/2006 | Stark | H04N 21/4131 725/135 |
| 2007/0011012 A1* | 1/2007 | Yurick | G10L 15/26 704/277 |
| 2008/0215971 A1* | 9/2008 | Gillo | A63F 13/35 715/706 |
| 2009/0276215 A1* | 11/2009 | Hager | G06F 16/31 704/235 |
| 2010/0100376 A1* | 4/2010 | Harrington | G10L 15/26 704/235 |
| 2010/0323728 A1* | 12/2010 | Gould | H04M 7/0048 455/466 |
| 2016/0360034 A1* | 12/2016 | Engelke | H04L 67/02 |
| 2017/0085506 A1* | 3/2017 | Gordon | H04L 51/066 |
| 2017/0201613 A1* | 7/2017 | Engelke | G10L 15/26 |
| 2018/0034961 A1* | 2/2018 | Engelke | H04W 4/06 |
| 2020/0007671 A1* | 1/2020 | Engelke | H04M 1/2475 |
| 2020/0243094 A1* | 7/2020 | Thomson | G10L 15/26 |
| 2020/0366789 A1* | 11/2020 | Patron | H04M 3/53333 |
| 2022/0115020 A1* | 4/2022 | Bradley | G06F 40/284 |

* cited by examiner

CAPTIONED TELEPHONE SERVICES IMPROVEMENT

CLAIM OF PRIORITY

This application claims the benefit of U.S. Provisional Application No. 62/980,686 filed Feb. 24, 2020, and is a continuation-in-part of U.S. patent application Ser. No. 15/930,612 filed May 13, 2020, which claims the benefit of US Provisional Application Nos. 62/849,425 filed May 17, 2019, 62/851,918 filed May 23, 2019 and 62/854,774 filed May 30, 2019, all of which are incorporated herein by reference in their entirety.

FIELD OF THE INVENTION

The present invention relates to IPCTS (Internet Protocol captioned telephone service), preferably using (ASR) Automated Speech Recognition, and still more particularly to systems configured to provide a user an ability to have at least one of (a) an ability to connect to and use the IPCTS service when a third party calls a number of the user not associated with the IPCTS service (b) call conferencing IPCTS which identifies each caller's contribution to the call, and/or (c) personal speech preference recognition (such as if odd geographic names or specialized medical or other terms are often used which are not particularly common to the general public).

BACKGROUND OF THE INVENTION

Ever since the telephone was invented individuals with hearing loss have struggled to communicate on it. Hearing the person on the other end of the call is a major problem for a hard of hearing user and the traditional PSTN (Public Switch Telephone Network) has never been configured to accommodate this need. Historically, the use of a relay service has been the solution. A relay service traditionally involves a third-party operator that helps facilitate communication between the two parties on a call. The first relay service used a TTY (Teletypewriter) that allowed the hearing-impaired user to read what the other party was saying. It would work by having the far end caller speak, then operator would listen to what was being said and then type it word for word, in essence "relaying the message". The individual with hearing loss would then read conversation that the relay operator sent.

As technology changed so did relay services. The latest iteration of the relay service is IPCTS (Internet Protocol Captioned Telephone Service). IPCTS functions much in the same way as the traditional relay service except it relies on technology such as the internet and computers to speed up the transmission of the captions to the end user. IPCTS currently operates in one of two ways. First, by using a CA (Captioning Assistant) who listens to the conversation and then re-voices it to a computer. The computer then uses voice recognition software to turn the CA's speech into text which is then sent to the end user to read. A competing method of IPCTS uses highly trained transcriptionists that listen to the conversation and then retype every word which is ultimately sent to the user. In both cases the human CAs or Transcriptionists are an integral part of the conversation and service. Thanks to continued advances in technology computers are finally surpassing humans in accuracy and efficiency. ASR (Automated Speech Recognition) is the next major leap forward in IPCTS. Some IPCTS providers are beginning to experiment with a new "hybrid" approach where their call centers give the CA the ability to switch between ASR and the CA computer re-voicing to provide a better experience for the hearing-impaired user. A current U.S. Pat. No. 10,044,854, incorporated herein by reference, is one such improvement.

One feature of IPCTS is that the captioned text is not stored on a server controlled by the IPCTS. Such storage is currently expressly forbidden by the Federal Communication Commission. Once the text is sent, it cannot be recalled by the IPCTS.

Another issue arises for IPCTS users when a doctor or other party calls them on a line that is not associated with an IPCTS service.

Additionally, problems arise for IPCTS users through the prospects of potentially having a conference call. Current IPCTS systems could not handle well, and certainly could not separate out, which parties said what.

Finally, another problem is created by traditional automated speech recognition (ASR) software. Most versions of modern ASR software preferentially "recognize" commonly used words. If someone lives in an odd area such as an area dominated by awkwardly spelled terms, particularly those in low population areas (such as Chuathbaluk or Kupreanof, Ak., etc.), much ASR technology would not normally properly recognize some words. This same problem can happen when trying to identify highly technical language utilized in some fields such as medicine (such as prophylaxis, etc.) and others. While there are software programs that can customize preferred words to specific individual's likely usage, no party is known to employ such software with IPCTS.

The applicant appreciates improvements have been made in the field of IPCTS, but still further improvements are believed to be desirable to provide improved services for at least users with hearing loss.

SUMMARY OF THE INVENTION

It is an object of many embodiments of the present invention to provide improved IPCTS services to a user.

It is another object of many embodiments to provide improvements to the field of captioned telephone services.

It is another object of at least some embodiments of the present invention to provide improved communication services though captioned telephone services, such as an ability for an IPCTS subscriber to receive a call on a line not affiliated by an IPCTS service from another party and then conference or otherwise join the user's IPCTS number and/or account so that the IPCTS service can transcribe the call.

Another object of at least some embodiments of the present invention is to have an ability to perform conference call IPCTS whereby each party's contribution to the call is separated out with transcribed text, such as by color, telephone number, caller 1, caller 2, etc., and/or names, and/or by other means.

Finally, for at least some embodiments, personalized vocabulary words can be prioritized for that individual by the IPCTS without contributing to the ASR vocabulary preference body of the public as a whole. The IPCTS system may then recognize odd geographical terms, infrequently utilized technical terms and/or other terms utilized by this individual which may not necessarily correspond to the public as a whole.

Accordingly, in accordance with many embodiments of the present invention, a captioned telephone service is provided. A first caller (aka, a remote party) attempts to call a user through the service. Specifically, the first caller could call the telephone number controlled by the system. Alternatively, the user (aka, a subscriber to the IPCTS system), may call the first caller. However, when this does not occur, i.e., two numbers are connected not supported by a IPCTS system, a problem of lack of transcription capability would normally occur in the product. However, the applicant has discovered and implemented a way for transcription services in such situations. The IPCTS subscriber can conference in or otherwise join the user's IPCTS number or account such as by conferencing in the user's IPCTS number so that the IPCTS system then transcribes the call.

With a call initiated, the user, if not previously connected to the IPCTS system, may connect to the IPCTS system. At least the user preferably has an IPCTS telephone number, and the service preferably applies ASR to the call. The first caller's text, the user's text, along with other caller's text, can be transcribed in almost real time. Furthermore, all of the connected parties with the user to the IPCTS system can be transcribed for the user to view the conversation as it occurs if the user is connected to the IPCTS service during the entire call. The ASR software, if utilized, can transfer to text not only the first (and any other) caller's spoken words, but also the user's speech, while potentially separating the two caller's speech as has been done in application Nos. 62/849,425, filed May 17, 2019, 62/851,918 filed May 23, 2019, and/or 62/954,774 filed May 30, 2019, all of which are incorporated herein by reference in its entirety.

With prior art of IPCTS systems, conference calls would have been extremely difficult to transcribe, if at all. Furthermore, since an individual would have been listening and typing, it is extremely unlikely that the transcriber could or would have identified which party said which text. This would have been more difficult as the number of callers on the conference call increased. However, with one option provided by the applicant, for at least some embodiments, each caller's contribution on a conference call can be transcribed and ascribed to that particular caller. Not only does this work for each telephone number that calls into a number provided through the IPCTS service, but also to a conference call in which the IPCTS service is joined as described above. Specifically, the software utilized by the applicant can, even if not provided through separate telephone lines, still distinguish the voices, and identify as Speaker 1, Speaker 2 etc., or otherwise.

Furthermore, some embodiments of the present invention provide an ability to prioritize certainly vocabulary words. Most ASR software utilizes a global database of terms and likely usage. However, that algorithm is normally in a continuous state of update. However, the applicant's algorithm can be changed for certain individuals and not contribute to the global uses database for at least some embodiments.

Specifically, the applicant intends to have users be able to prioritize certain vocabulary words that they may use, that the general public may not, in an effort to better suit their specific situation. Alternatively, the system may learn words of the user over time. For instance, some users may live in an area for which a location has a relatively insignificant use as it relates to the common uses but would be utilized with great frequency with that particular user (i.e., Kupreanof, Ak., etc). Other users may utilize specific medial terms that are not utilized by the general public in very large frequency but are utilized by that individual on a relatively routine basis (i.e., prophylaxis, etc.). Still other words may have advantage to be prioritized by specific users.

Any of these various improvements may be desirable for various users.

BRIEF DESCRIPTION OF THE DRAWINGS

The accompanying drawings illustrate preferred embodiments of the invention and, together with the description, serve to explain the invention. The drawings may not show elements to scale. These drawings are offered by way of illustration and not by way of limitation.

DETAILED DESCRIPTION OF THE PREFERRED EMBODIMENTS

Figure 1:
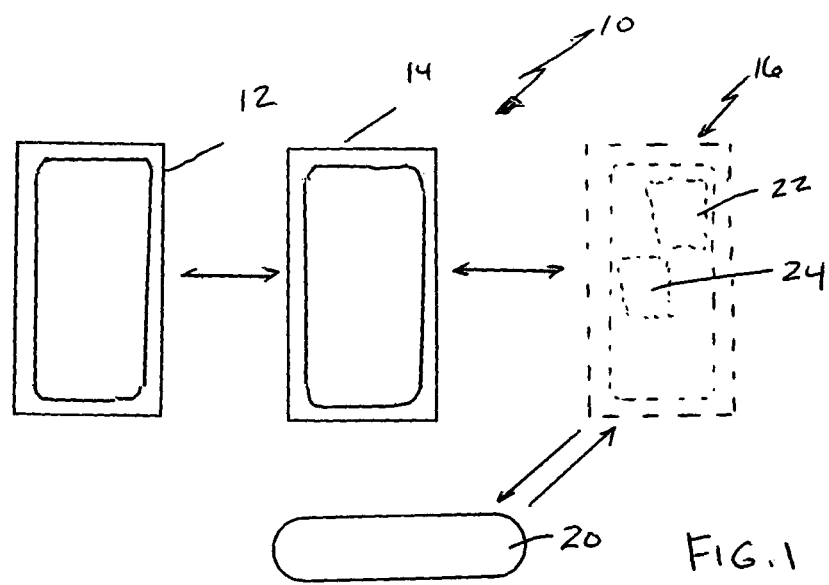
FIG. 1 is a schematic view showing two devices not associated with an IPCTS system connected to a number of an IPCTS system to provide IPCTS text to a user.

FIG. 1 shows a presently preferred embodiment of the present invention of two people talking from phones 12,14 that are not connected to an IPCTS service 20. This could happen if the user has an old phone line that is not connected to the service or if an individual such as a doctor has an old phone number of the user (not connected to the IPCTS service) that is called by that individual. The user may conference in or otherwise connect to the IPCTS service number which is shown with a phone 16 in phantom. Phone 16 may then actually be phone 14, and allow the user to communicate back and forth with the IPCTS service 20 to receive the text bubbles 22,24 almost in real time as it exchanges between the users of phones 12,14. Take in mind that the text 22,24 is expected in many embodiments to appear on screen of the user's phone 14 during this process for many embodiments.

Figure 4:
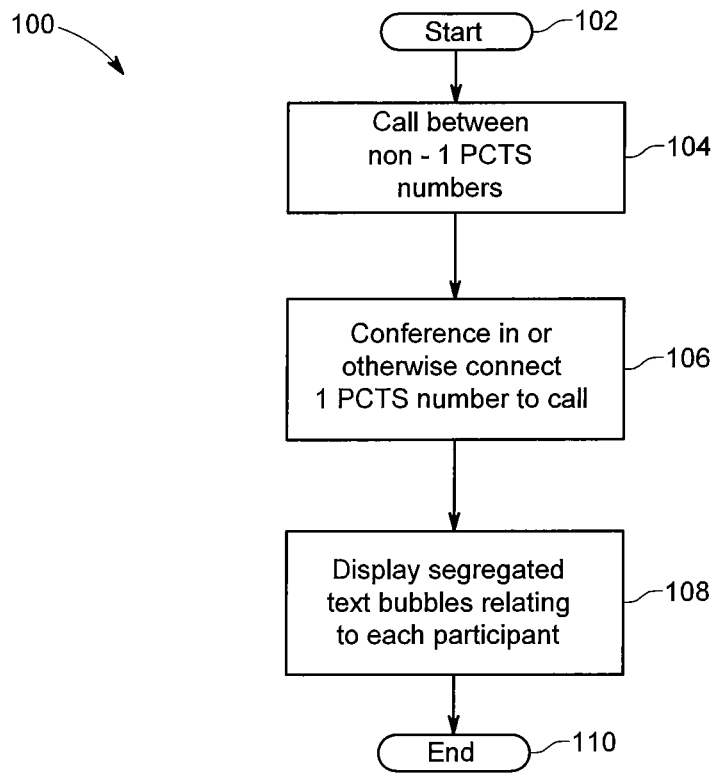
FIGS. 4, 5, and 6 are flowcharts of exemplary methods for providing captioned telephone service (CTS) text for the embodiments of FIGS. 1-3, respectively, of currently preferred embodiments of the present invention.

A flow chart of this embodiment is shown in FIG. 4 of this process 100 starting at start point 102 with the call initiated between two non-IPCTS numbers at step 104. Then an IPCTS number is conferenced in or otherwise joined at step 106 which belongs to one of the two parties 12,14. Then the text will display on the IPCTS device 108 which could very well be the device 14 or otherwise. Once the call is over the process 100 ends at step 110.

Figure 2:
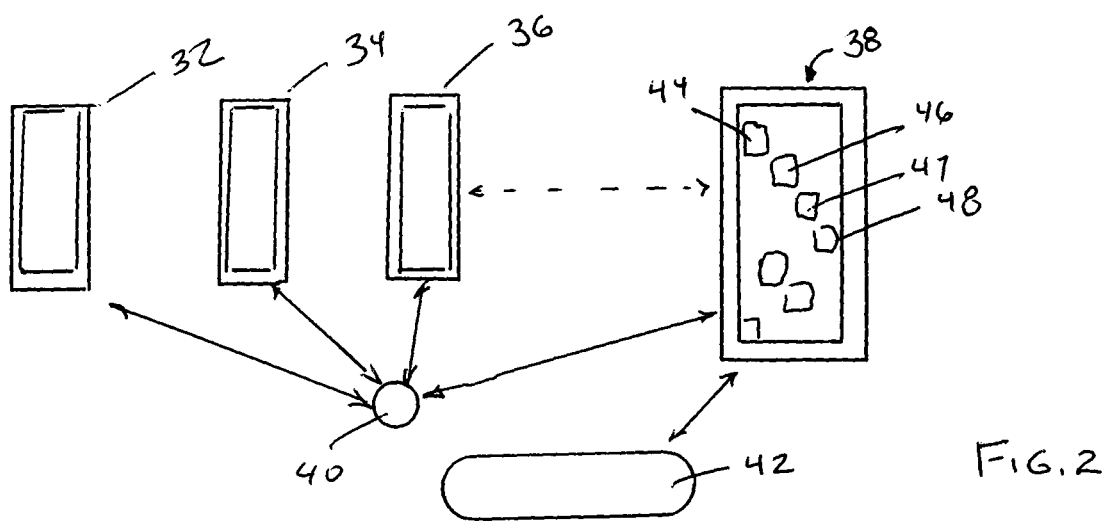
FIG. 2 is a schematic view showing a conference all providing separated text from each caller by the IPCTS system.

FIG. 2 shows an embodiment with multiple devices 32,34,36,38 connected in conference call such as by calling to a service 40 or it being hosted by any one of the various devices 32,34,36,38, etc. There could be additional devices as well for various embodiments. Device 38 is shown as being an IPCTS subscriber communicating back and forth with service 42 so that each party's text bubbles 44,46,47,48 appears in as segregated by caller (from devices 32,34,36, 38, respectively) in one of various ways as understood by those of ordinary skill in the art. Text bubbles 44,46,47,48 could be differentiated by color, they could be differentiated by placement on the screen and/or other effects such as understood by those of ordinary skill in the art. However, no one is known in the art to provide IPCTS conference calling capability whereby the text bubbles each of the speakers are separated identified by caller. This service could also be combined with the embodiment of FIG. 1 and FIG. 4 whereby during a conference call the IPCTS subscriber (initially using a non-IPCTS service) could connect to an IPCTS number of service 20,42 which could then identify separate callers devices 32,34,36,38 possibly by the characteristics of their voice and still assign text bubbles 44,46, 47,48 to each of the specific callers for various embodiments. Other technology could be utilized to identify the various speakers as well.

Figure 5:
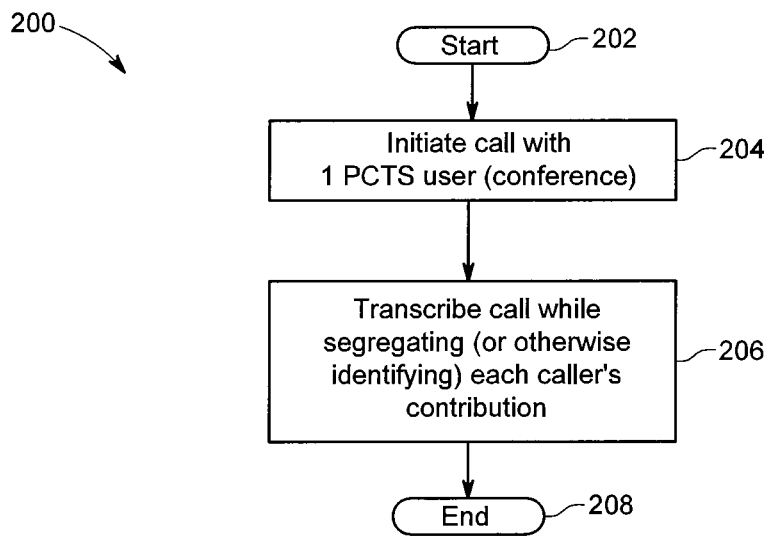

FIG. 5 shows an embodiment of a flowchart 200 beginning at start 202 and then initiating conference call at step 204 with IPCTS user. The system 42 transcribes the text while identifying who said what in step 206 as text bubbles 44,46,47,48 or otherwise before the call ends at step 208. The transcribed text bubbles 44,46,47,48 are shown appearing on the device 38 of user as is shown in FIG. 2.

Figure 3:
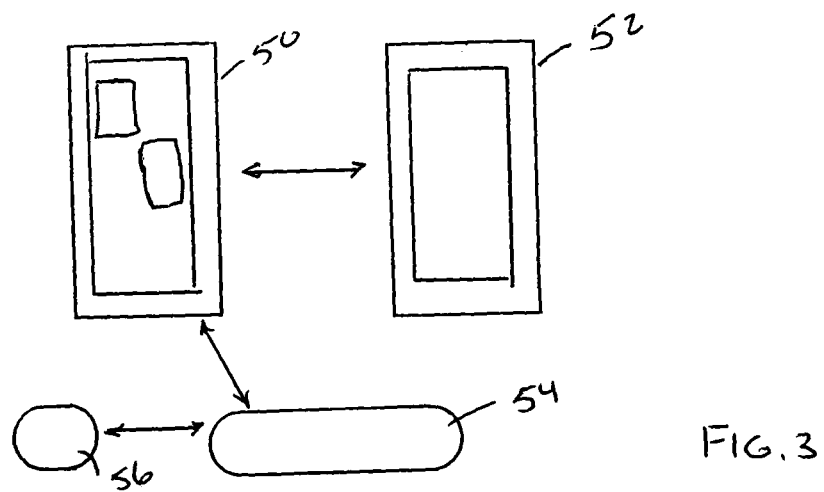
FIG. 3 is a schematic view of a personalized search engine utilized with some embodiments of the present invention.

Finally, FIG. 3 shows an embodiment where an IPCTS user device 50 conducting a call with another party 52 whereby the IPCTS system 54 transcribes text between the two parties but since user 50 believes they utilize certain words more often than the general public, they provide specific words to the IPCTS system 54 to be utilized with a personal database at 56 which could include such difficult words to spell as various medical terms, location terms, or other words that the user 50 believes would normally be difficult for the system 54 to recognize. Additionally, these specific words on the database 56 may not be common to the generally public and do not need to be utilized in an automatic speech recognition software to add to the general public due to their relatively low frequency of use amongst the general public.

Accordingly, the database 56 is not passed to other users as normally happen in ASR technology. One likely word is "deaf" which is utilized with great frequency as compared to the general public as often the pronunciation of this words is confused with "death" which might otherwise appear more frequently in the text streams as a miscommunication of the term deaf by certain ASR software. Accordingly, the user can help assist the algorithm identify which words are more frequently utilized for themselves than the general public. How much weight is given to any particular word could be at least partially controlled by the user. Furthermore, these preferences could change over time, daily or at other periods. Priorities could range from above average, to high priority, etc.

Figure 6:
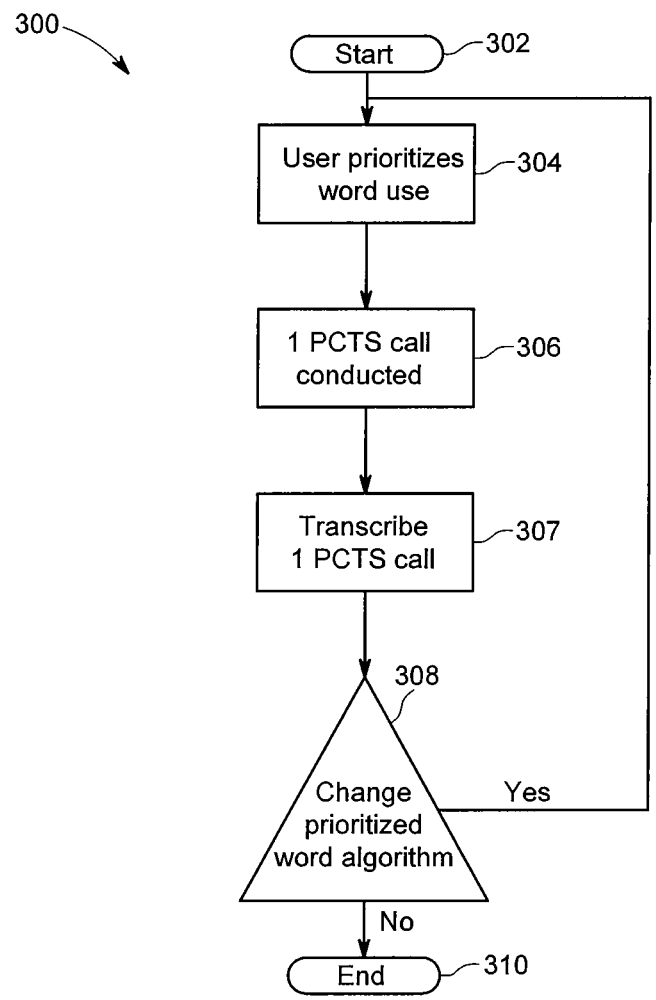

FIG. 6 shows a process 300 starting at step 302 with the user providing personalized database of words which could be updated (at any time) at step 304 and transcribing text appears at step 306 with the user be given an opportunity to update the database in step 308 before the process ends at step 310. The database 56 or algorithm of preferential selection and/or prioritization of words utilized by that specific user may be utilized by the service 50 without contribution to a larger population.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed herein is:

1. A method of audio to text transcription provided by a captioner company comprising the steps of:
   a) a far end caller connected to a user in audio communication in a connection with a telephone number not managed by a captioned telephone service manager;
   b) said far end caller connecting a separate telephone number managed by a captioned telephone service manager to the connection;
   c) said captioned telephone service manager utilizing a captioner to transcribe audio to text of the far end caller and sending the text to a device of the user in approximately real time; and
   d) a third party caller separate from the far end caller and the user joining in a conference call with the user and far end caller with the captioned telephone service manager utilizing the captioner to transcribe audio to text from the third party caller and provide to a device of the user; wherein the text of the far end caller, the user and the third party are separated by separate text bubbles segregated from one another on a screen of the device of the user.

2. The method of claim 1 wherein the text bubbles associate with the far end caller, the user and the third party are differentiated by color.

3. The method of claim 1 wherein one of the far end caller calls the telephone number managed by the captioned telephone service to initiate the connection, and the user joins to the telephone number managed b the captioned telephone service after connection with the far end caller.

4. The method of claim 1 wherein more than one third party join the conference call with the text of the third parties are differentiated in separated and segregated text bubbles.

5. The method of claim 1 wherein the captioner is automated speech recognition software controlled by the captioned telephone service manager.

6. A method of audio to text transcription provided by a captioner company comprising the steps of:
   a) a far end caller connected to a user in audio communication with a telephone number managed by a captioned telephone service manager;
   b) said captioned telephone service manager utilizing a captioner transcribe audio to text of the far end caller and sending the text to a device of the user in approximately real time; and
   c) a third party caller separate from the far end caller and the user joining in a conference call with the user and far end caller with the captioned telephone service manager utilizing the captioner to transcribe audio to text from the third party caller and provide to a device of the user; wherein the text of the far end caller, the user and the third party are separated by separate text bubbles segregated from one another on a screen of the device of the user; and
   further comprising a prioritized vocabulary for the user of the same language used by the user which is maintained by the captioned telephone service manager specifically for use with only the user, with the prioritized vocabulary not made available to others.

7. The method of claim 6 wherein the user provides words to the captioned telephone service manager which may be less common than used by the public.

8. The method of claim 7 wherein the words are one of geographic and technical in nature.

9. The method of claim 7 wherein the user ascribes a likely priority to words likely to be used in conversations with and by the user.

10. The method of claim 6 wherein the captioned telephone service manager provides a prioritized vocabulary for each user based on communications of the user.

\* \* \* \* \*

UNITED STATES PATENT AND TRADEMARK OFFICE
CERTIFICATE OF CORRECTION

| | | |
|---|---|---|
| PATENT NO. | : 11,601,548 B2 | Page 1 of 1 |
| APPLICATION NO. | : 17/184006 | |
| DATED | : March 7, 2023 | |
| INVENTOR(S) | : Beryl Bucher and James van den Bergh | |

It is certified that error appears in the above-identified patent and that said Letters Patent is hereby corrected as shown below:

On the Title Page

Item (12), United States Patent, Inventors should read:
-Bucher et al.-

Item (71), Applicants, should read:
-Beryl Bucher, Chattanooga, TN
James van den Bergh, Chattanooga, TN- Item (72), Inventors, should read:
-Beryl Bucher, Chattanooga, TN
James van den Bergh, Chattanooga, TN- Signed and Sealed this
Twentieth Day of May, 2025

Coke Morgan Stewart
*Acting Director of the United States Patent and Trademark Office*